United States Patent
Derehag et al.

(10) Patent No.: US 6,797,912 B2
(45) Date of Patent: Sep. 28, 2004

(54) METHOD AND A DEVICE FOR MANUFACTURING A STATOR COMPONENT OR ROTOR COMPONENT

(75) Inventors: Bengt Derehag, Trollhattan (SE); Alf Petersson, Ryd (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

(21) Appl. No.: 10/605,171

(22) Filed: Sep. 12, 2003

(65) Prior Publication Data

US 2004/0112871 A1 Jun. 17, 2004

Related U.S. Application Data

(63) Continuation of application No. PCT/SE02/00086, filed on Jan. 18, 2002, now abandoned.

(30) Foreign Application Priority Data

Mar. 14, 2001 (SE) .............................................. 0100880

(51) Int. Cl.$^7$ .............................. B23H 1/00; B23H 9/00
(52) U.S. Cl. ................................ 219/69.17; 219/69.15; 219/69.2
(58) Field of Search ........................... 219/69.11, 69.15, 219/69.17, 69.2; 29/889.7; 205/640; 204/224 M

(56) References Cited

U.S. PATENT DOCUMENTS

| | | | |
|---|---|---|---|
| 4,888,863 A | 12/1989 | Cox et al. | 29/156.8 |
| 5,014,421 A | 5/1991 | Swarden et al. | 29/889.7 |
| 5,188,514 A * | 2/1993 | Inserra et al. | 416/223 A |
| 5,922,222 A * | 7/1999 | Jens et al. | 219/69.17 |
| 6,627,837 B1 * | 9/2003 | Carboneri et al. | 219/69.17 |
| 6,676,826 B2 * | 1/2004 | Battistini et al. | 205/674 |

FOREIGN PATENT DOCUMENTS

| | | | |
|---|---|---|---|
| DE | 4203656 A1 * | 8/1993 | B23H/7/02 |
| EP | 327657 A1 * | 8/1989 | B23H/9/10 |

* cited by examiner

Primary Examiner—Geoffrey S. Evans
(74) Attorney, Agent, or Firm—Novak Druce LLP

(57) ABSTRACT

Method and arrangement for manufacturing a disk-shaped or annular stator component or rotor component with a plurality of blades arranged one after another in a path extending around the component and a cover (15) arranged outside the blades in the radial direction and in contact therewith. According to the method, at least a portion (11) of a first set of channels (12) is spark-eroded simultaneously out of a disk-shaped or annular workpiece (2) intended for forming the component at a distance from the edge (14) of the workpiece in the radial direction, which channels (12) are intended to delimit the blades in the circumferential direction of the workpiece.

16 Claims, 3 Drawing Sheets

METHOD AND A DEVICE FOR MANUFACTURING A STATOR COMPONENT OR ROTOR COMPONENT

CROSS REFERENCE TO RELATED APPLICATIONS

This present application is a continuation patent application of International Application No. PCT/SE02/00086 filed 18 Jan. 2002, now abandoned, which was published in English pursuant to Article 21(2) of the Patent Cooperation Treaty, and which claims priority to Swedish Application No. 0100880-4 filed 14 Mar. 2001. Both applications are expressly incorporated herein by reference in their entireties.

BACKGROUND OF INVENTION

1. Field of the Invention

The present invention relates to a method for manufacturing a disk-shaped or annular stator component or rotor component with a plurality of blades arranged one after another in a path extending around the component for guiding a gas flow. In other words, such a component can be used in both static applications (stators) and dynamic applications (rotors). This component is commonly referred to as a "blisk" (bladed disk) or a "bling" (bladed ring). The invention also relates to a device for manufacturing such a stator component or rotor component.

In the following description, the stator component or rotor component is intended to be arranged in a turbopump in a space application. Turbopump means a unit which comprises (includes, but is not limited to) at least a turbine and a pump part driven by the latter. The invention is not to be regarded as being limited to this application, however, but can also be used in a gas turbine. Other areas of application are also possible, such as in engines for vehicles, aircraft, power plant equipment for vessels and power stations for electricity production.

The stator component or rotor component is often designed with an annular cover outside, in the radial direction, and in contact with the blades. This cover outside the blades is arranged for the purpose of counteracting leakage from a pressure side to a suction side of the blades concerned. Such leakage is associated with efficiency losses.

2. Background

There are a number of different known ways of manufacturing such a stator component or rotor component. According to a previously known manufacturing technique, each of the blades is manufactured individually. The blades are subsequently secured with a mutual spacing in a groove on the periphery of a circular disk so that they project in the radial direction from the latter. Each of the blades is often manufactured with a cover part in such a way that an essentially continuous cover is formed after the blades have been mounted on the circular disk.

It is also known to use spark erosion in the manufacture of the stator component or rotor component. In this case, each blade is produced separately by spark-eroding a disk-shaped or annular workpiece intended to form the component. Four spark-erosion stages (and four different spark-erosion electrodes) are required for manufacturing each of the blades. During spark erosion, half the blade is machined from a first side of the workpiece via a first and a second spark-machining operation on the pressure side and, respectively, the suction side of the blade. When all the blades have been machined from the first side of the workpiece, it is turned, and the remaining part of each of the blades is machined from the second side of the workpiece via a third and a fourth spark-machining operation.

SUMMARY OF INVENTION

One object of the invention is to provide a method for manufacturing a disk-shaped or annular stator component or rotor component which is time-efficient and cost-effective. The invention also aims to achieve a manufacturing method which creates possibilities for a component with great strength and improved efficiency.

This object is achieved by virtue of the fact that at least a portion of each of a plurality of channels in a first set of channels is spark-eroded simultaneously out of a disk-shaped or annular workpiece intended for forming the component, which channels are intended to delimit the blades in the circumferential direction of the workpiece.

On the whole, the manufacturing method is non-sensitive to the material to be machined. The stator component or rotor component is manufactured from a single piece of material, which creates possibilities for great strength, especially in combination with a material which tolerates great temperature transients, such as what is known as a superalloy. In order for it to be possible to machine a plurality of channels simultaneously, a plurality of spark-erosion electrodes are in engagement with the workpiece, simultaneously.

In such spark-machining, material is removed from the surface of the workpiece under the action of a power density which arises when short electrical discharges take place between a spark-erosion electrode and the workpiece. Here, the spark-erosion electrode has the shape of a negative replica of the intended shape of the channel.

According to a preferred embodiment of the invention, after spark erosion of the portion of the first set of channels, the workpiece is rotated through a distance in its circumferential direction, and then at least a portion of each of a plurality of channels in a second set of channels is spark-eroded. The spark-erosion electrodes intended for the spark erosion are therefore arranged at a spacing in the circumferential direction of the workpiece which is greater than the intended spacing between the channels. In other words, machining of a plurality of channels takes place simultaneously, after which the spark-erosion means is indexed and a new set of channels can be machined out of the workpiece.

According to a development, the workpiece is turned after all the channels have been spark-eroded from a first side of the same, and the remaining portion of the channels is then spark-eroded in the same way from its second side. In this way, relatively complex blade shapes can also be produced.

According to another preferred embodiment, the channels are spark-eroded at a spacing from the edge of the workpiece in the radial direction so that a cover is formed outside the blades in the radial direction and in contact therewith. In other words, the cover is formed by the material of the workpiece remaining outside the blades in the radial direction. In this way, a continuous cover is formed which creates possibilities for a component with great efficiency.

According to another preferred embodiment of the invention, in a first operation, a plurality of spark-erosion electrodes are machined, with a mutual spacing along a curved path, from at least one basic element arranged on a means intended for the spark erosion, and, in a second operation, the channels are spark-eroded from the workpiece by means of the spark-erosion electrodes. The machining in the first operation preferably comprises milling. The method for manufacturing the component therefore comprises two stages, namely firstly manufacturing the tool itself which is to be used for spark erosion and subsequently spark-eroding the workpiece by means of the spark-erosion tool manufactured in this way.

According to a development of the preceding embodiment, the attachment of the spark-erosion means has such a shape that it can be used on the one hand in a machine tool for the manufacture of the spark-erosion electrodes and on the other hand in a spark-erosion machine for the manufacture of the channels by spark erosion. In this way, the method can be implemented by means of conventional machines for milling and spark erosion.

According to another development of the preceding embodiment, a plurality of the basic elements are arranged on the spark-erosion means in a path extending around the means before machining, and at least one of the spark-erosion electrodes is machined from each of them in the first operation. By using a plurality of such basic elements, only one of these has to be replaced if one of the spark-erosion electrodes should for any reason become defective during milling thereof or during movement and mounting of the spark-erosion means in the spark-erosion machine.

Another object of the invention is to produce a device which creates possibilities for time-efficient and cost-effective manufacture of a disk-shaped or annular stator component or rotor component. This object is achieved by a device according to claim 12. Further advantageous embodiments of the invention emerge from the following claims and the description.

BRIEF DESCRIPTION OF DRAWINGS

The invention will be described in greater detail below with reference to the embodiments shown in the accompanying drawings, in which.

DETAILED DESCRIPTION

According to at least one embodiment of the invention, a method for manufacturing a stator component or rotor component 1 comprises two stages: firstly manufacturing the tool itself which is to be used in subsequent spark erosion and then spark-eroding a workpiece 2 by means of the spark-erosion tool manufactured in this way. Here, the manufacture of the spark-erosion tool is carried out by milling.

Figure 2:
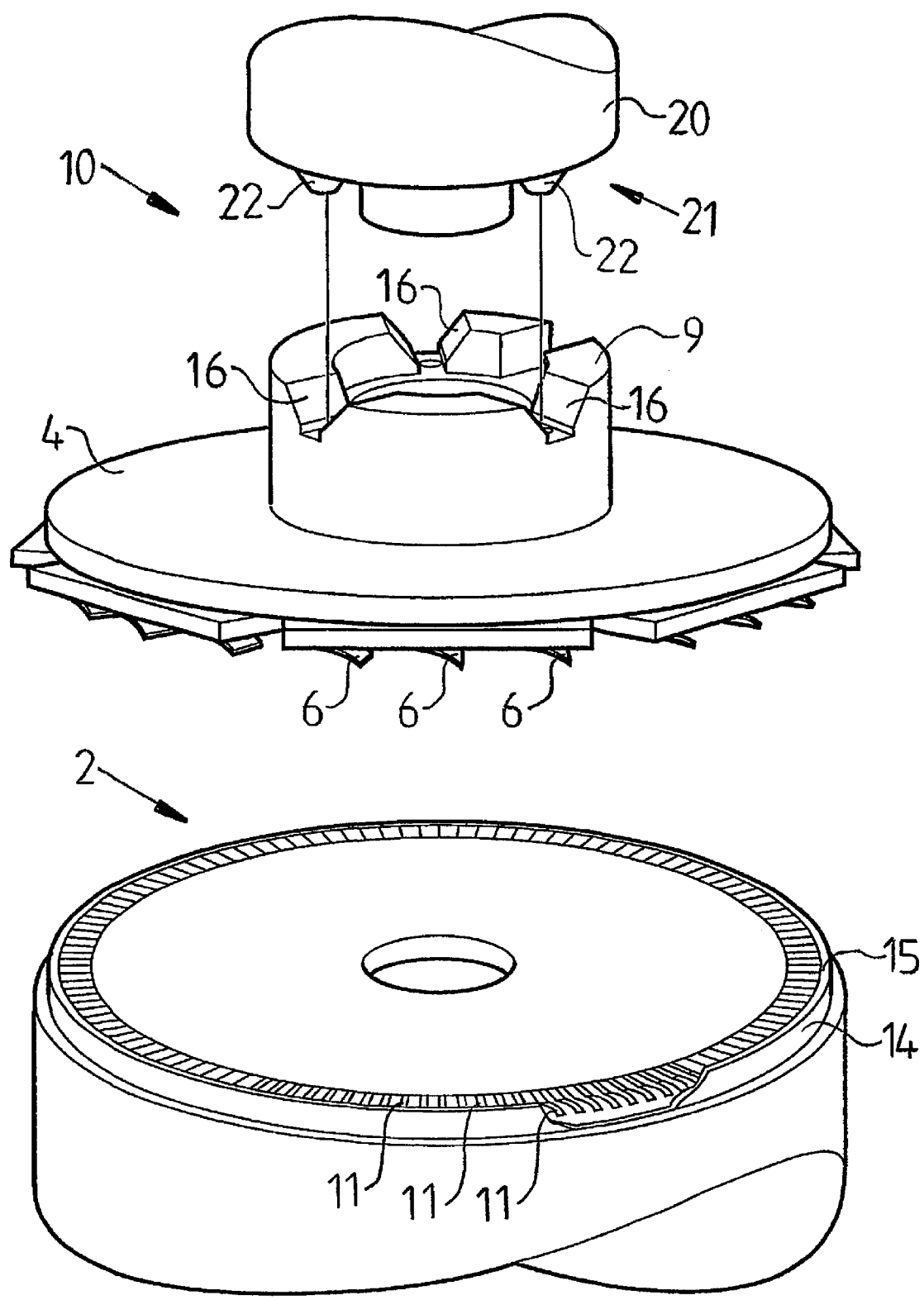
FIG. 2 illustrates a partly cut-away perspective view of the workpiece arranged in a spark-erosion machine.

In spark-machining, material is removed from the surface of the workpiece 2 under the action of a power density which arises when short electrical discharges take place between a spark-erosion electrode 6 and the workpiece 2 (see FIG. 2). The workpiece 2 and the spark-erosion tool are submerged in a dielectric liquid, voltage is applied, and material is then burned away from the workpiece. In this way, the spark-erosion tool forms a cathode and the workpiece forms an anode. Furthermore, the spark-erosion electrode has the shape of a negative replica (mold-shape) of the intended shape of the cutout.

Figure 1:
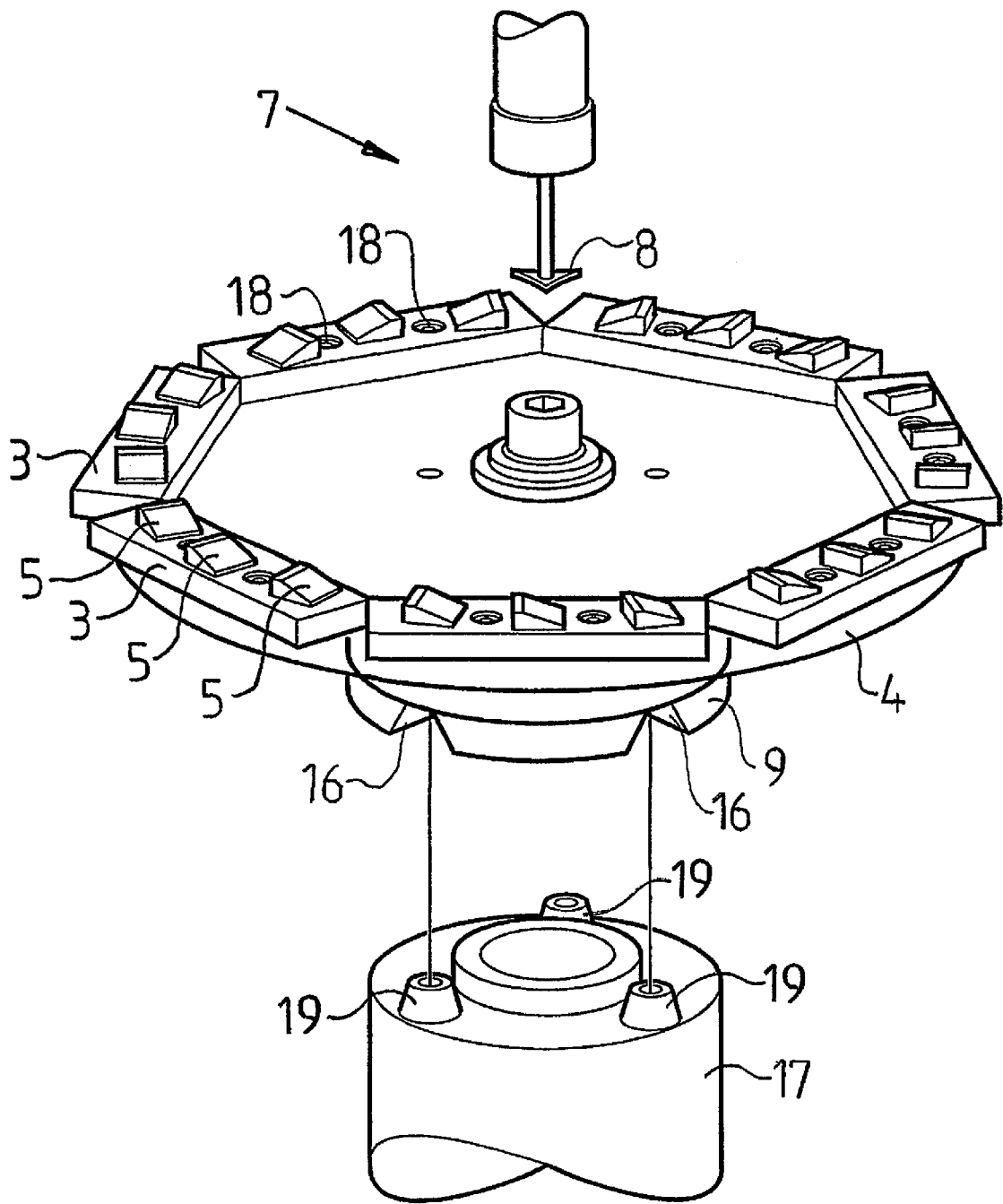
FIG. 1 illustrates a perspective view of a spark-erosion means arranged in a milling machine for milling spark-erosion electrodes.

FIG. 1 shows a plurality of basic elements 3 arranged in an at least essentially circular path on a top side of a holder element which comprises a disk 4. The basic elements 3 are secured on the disk 4 by screw joints 18. Each of the basic elements 3 has three upwardly projecting portions 5 which are intended to form spark-erosion electrodes 6 as depicted in FIG. 2. The disk 4 is arranged in a milling machine 7 and each of the projecting portions 5 is then intended to be machined using a milling tool 8. The upwardly projecting portions 5 are arranged at a sufficiently great spacing from one another for it to be possible to reach with the milling tool 8 for the purpose of giving the projecting portions 5 the desired shape.

In a first operation of the method, the spark-erosion electrodes 6 are machined from the basic elements 3 by milling, with a mutual spacing along a circular path. The holder element comprising the disk 4 and a first machine attachment part 9 located under the disk and connected rigidly thereto form a spark-erosion means intended for a spark-erosion operation following the milling operation. The first machine attachment part 9 is designed so as to be capable of being used both in a milling machine and in a spark-erosion machine. The first machine attachment part 9 is designed so as to fit together with a second machine attachment part 17 of the milling machine. To this end, the first and second machine attachment parts 9, 17 are designed with male and female parts for engagement with one another. The first machine attachment part 9 has three recesses 16 arranged with even spacing in the circumferential direction of the disk 4. The recesses 16 are open in a direction opposite to that side of the disk 4 on which the basic pieces 3 are arranged. The second machine attachment part 17 has three projecting portions 19 for fitting into the recesses 16. In this way, highly accurate centering of the disk 4 is brought about. The projecting portions 19 have the shape of a truncated cone. The spark-erosion means is referred to below using reference number 4. FIG. 1 illustrates the basic elements 3 before milling has been started.

Figure 3:
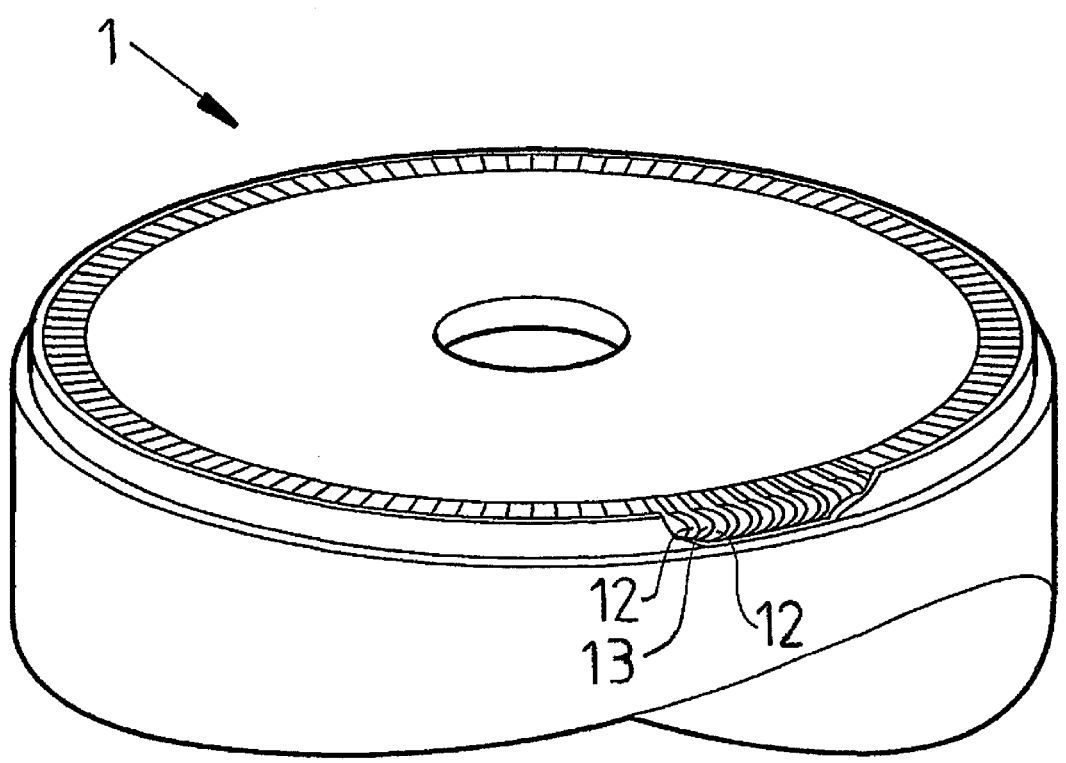
FIG. 3 illustrates a partly cut-away perspective view of the disk-shaped or annular stator component or rotor component.

In FIG. 2, the spark-erosion, or just erosion means 4 is arranged at the top in a spark-erosion, or just erosion machine 10. In relation to FIG. 1, the spark-erosion means 4 has been turned through 180° so that the spark-erosion electrodes 6 project downward. According to the embodiment illustrated in FIGS. 1 and 2, the spark-erosion means 4 has seven basic elements 3 which each have three spark-erosion electrodes 6. In total, there are twenty-one spark-erosion electrodes. After a reciprocating movement of the spark-erosion means during spark erosion, twenty-one cutouts 11 are therefore formed in a workpiece 2. FIG. 2 illustrates that the cutouts 11 do not extend through the entire thickness of the disk. The cutouts 11 are intended to form channels 12 as depicted in FIG. 3. Two adjacent such channels 12 in turn delimit a blade 13. The cutouts 11 extend roughly halfway through the disk.

The spark-erosion machine has a third machine attachment part 20 as shown in FIG. 2. The lower portion 21 of this part is designed for engagement with the recesses 16 and is preferably identical with the second machine attachment part 17 of the milling machine 7 for the purpose of bringing about good centering of the spark-erosion means 4. The third machine attachment part 20 therefore has three cone-shaped projecting portions 22 for engagement with the recesses 16.

In a first spark-erosion stage, a portion (the 21 cutouts 11) of each of a plurality of channels 12 in a first set of channels is therefore machined out of the workpiece 2. The spark-erosion means 4 is then rotated through a number of degrees and then, in a second spark-erosion stage, 21 further cutouts are machined. The spark-erosion operation continues with further rotation of the spark-erosion means followed by further spark-erosion stages until the spacing between two adjacent cutouts 11 in the circumferential direction of the workpiece 2 is essentially the same around the entire workpiece and corresponds to the desired blade thickness.

As can be seen from FIG. 2, material is machined away from the workpiece 2 at a spacing from its edge 14 in the radial direction. A portion is therefore retained outside the channels 12. This portion is intended to form a cover 15 for the blades 13 that are subsequently formed. FIG. 2 illustrates the workpiece when the spark-erosion operation from a first flat side thereof has been performed.

The spark-erosion operation continues after the workpiece 2 has been turned, and spark-machining is then carried out in the same way at the second flat side. The cutouts from the second side of the workpiece are spark-machined out of the workpiece 2 so that they are connected to the cutouts 11 from the first side; in this way the channels 12 are formed. The channels 12 will thus extend through the workpiece in the axial direction at a spacing from a peripheral edge 14, in the radial direction. The blades 13 are defined between the channels 12 in the circumferential direction of the workpiece.

Each of the spark-erosion electrodes 6 has a shape which corresponds essentially to the shape of the desired channels 12. In order to bring about the desired domed shape of the blades 13, the spark-erosion means 4 is made to perform both a reciprocating movement and a rotary movement in each spark-erosion stage. To be precise, each spark-erosion electrode 6 is guided into the workpiece 2 along a predetermined path. The spark-erosion means 6 is made to perform an oscillating movement when the spark-erosion electrodes have reached their final position in order to produce the desired structure on the channel walls.

Two opposite surfaces of each of the channels in the circumferential direction of the disk are simultaneously spark-eroded and, more precisely, by the same spark-erosion electrode 6. In other words, the convex surface of one blade and the concave surface of an adjacent blade are spark-eroded simultaneously.

The machine attachment 9 of the spark-erosion means 4 is designed so that it is possible to use the spark-erosion means 4 both clamped on, in a static position, in a milling machine for machining the spark-erosion electrodes 6 and for rotation in a spark-erosion machine for the purpose of machining the workpiece 2.

The invention is not to be regarded as being limited to the illustrative embodiments described above, but a number of further variants and modifications are conceivable within the scope of the following patent claims.

For example, methods other than milling are possible for manufacturing the spark-erosion tool, for example, by grinding and wire spark erosion.

What is claimed is:

1. A method for manufacturing a disk-shaped or annular stator component or rotor component (1) with a plurality of blades (13) arranged one after another in a path extending around said component for guiding a gas flow, said method comprising:

spark-eroding, simultaneously, at least a portion (11) of each of a plurality of channels (12) in a first set of channels out of a disk-shaped or annular workpiece (2) that is configured for forming the component (1), said channels (12) being configured to delimit said blades (13) in a circumferential direction of the workpiece (2).

2. The method as recited in claim 1, further comprising:
rotating the disk-shaped or annular workpiece (2), after spark erosion of said portion (11) of the first set of channels (12), through a distance in a circumferential direction; and spark-eroding at least a portion of each of a plurality of channels (12) establishing a second set of channels.

3. The method as recited in claim 1, further comprising:
turning the workpiece (2) after all the channels have been spark-eroded from a first side thereof; and spark-eroding the remaining portion of the channels (12) in the same way as the second side of the workpiece.

4. The method as recited in claim 1, further comprising:
manipulating an electrode (6) configured for spark erosion to simultaneously perform translatory movement and rotary movement during a course of trajectory by the electrode (6) through the workpiece (2).

5. The method as recited in claim 1, further comprising:
spark-eroding, simultaneously, two opposite surfaces of each of the channels (12) in the circumferential direction of the workpiece (2).

6. The method as recited in claim 5, further comprising:
spark-eroding opposite surfaces of each of the channels (12) utilizing the same spark-erosion electrode (6).

7. The method as recited in claim 1, further comprising:
spark-eroding said channels (12) at a spacing from the edge (14) of the workpiece in the radial direction so that a cover (15) is formed outside the blades in the radial direction.

8. The method as recited in claim 7, further comprising:
spark-eroding said channels (12) so that the cover (15) is formed in substantial contact with the blades.

9. The method as recited in claim 1, further comprising:
spark-eroding said channels (12) so that a cover (15) is formed in substantial contact with the blades.

10. The method as recited in claim 1, further comprising:
machining a plurality of spark-erosion electrodes (6) having a mutual spacing along a curved path in a first operation from at least one basic element (3, 5) arranged on a spark eroding means (4) configured for performing the spark erosion; and utilizing said spark-erosion electrodes (6), spark eroding the channels (12) from the workpiece (2).

11. The method as recited in claim 10, wherein an attachment portion (7) of the spark-eroding means (4) has a shape enabling use as a machine tool for manufacturing the spark-erosion electrodes (6) and use in a spark-erosion machine for manufacturing the channels (12) by spark erosion.

12. The method as recited in claim 11, wherein a plurality of the basic elements (3, 5) are arranged on the spark-erosion means (4) in a curved path before machining, and in that at least one of said spark-erosion electrodes is machined from each of them in the first operation.

13. The method as recited in claim 11, wherein said machining comprises milling.

14. A device for manufacturing a disk-shaped or annular-shaped stator or rotor component (1) having a plurality of blades (13) arranged one after another in a path extending around said component (1) for guiding a gas flow, the device comprising:

a spark-erosion means (4) configured to be connected to a voltage and to be brought into contact with a workpiece (2) for removal of material from the workpiece (2) thereby forming one of said blades;

said spark-erosion means (4) further comprising a plurality of spark-erosion electrodes (6) for said contact with the workpiece and which are arranged at a mutual spacing from one another in a curved path so that at least a portion (11) of each of a plurality of channels (12) in a first set of channels can be spark-eroded simultaneously out of the workpeice (2), which is disk-shaped or annular for forming the component (1), which channels (12) are configured to delimit said blades (13) in the circumferential direction of the workpiece.

15. The device as recited in claim 14, wherein the spark-erosion electrodes (6) are arranged one after another in a path which is at least partly circular.

16. The device as recited in claim 15, wherein the spark-erosion means (4) comprises a disk and a plurality of basic elements (3) secured on the disk, and each of the basic elements comprises a plurality of said spark-erosion electrodes (6).

* * * * *